US007297407B2

(12) United States Patent
Anderson

(10) Patent No.: US 7,297,407 B2
(45) Date of Patent: Nov. 20, 2007

(54) GLASS LAMINATES FOR REDUCTION OF SOUND TRANSMISSION

(75) Inventor: Jerrel C. Anderson, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/230,812

(22) Filed: Sep. 19, 2005

(65) Prior Publication Data

US 2006/0063007 A1    Mar. 23, 2006

Related U.S. Application Data

(60) Provisional application No. 60/611,596, filed on Sep. 20, 2004.

(51) Int. Cl.
B32B 17/06    (2006.01)
B32B 17/10    (2006.01)
B32B 27/08    (2006.01)
B32B 27/30    (2006.01)
B32B 27/36    (2006.01)

(52) U.S. Cl. ............. 428/441; 428/355 R; 428/426; 428/430; 428/442; 428/480; 428/483

(58) Field of Classification Search ............. None
See application file for complete search history.

(56) References Cited

U.S. PATENT DOCUMENTS

| | | | | |
|---|---|---|---|---|
| 3,816,201 | A * | 6/1974 | Armstrong et al. ........ 156/106 |
| 4,059,469 | A * | 11/1977 | Mattimoe et al. .......... 156/108 |
| 4,614,676 | A | 9/1986 | Rehfeld |
| 4,619,973 | A * | 10/1986 | Smith, Jr. ................ 525/329.9 |
| 4,663,228 | A * | 5/1987 | Bolton et al. .............. 428/334 |
| 4,742,107 | A | 5/1988 | Statz |
| 5,002,820 | A * | 3/1991 | Bolton et al. .............. 428/215 |
| 5,190,826 | A | 3/1993 | Asahina et al. |
| 5,368,917 | A | 11/1994 | Rehfeld et al. |
| 5,411,845 | A | 5/1995 | Robinson |
| 5,415,942 | A | 5/1995 | Anderson |
| 5,427,842 | A * | 6/1995 | Bland et al. ................ 428/213 |
| 5,478,615 | A | 12/1995 | Rehfeld et al. |
| 5,690,994 | A * | 11/1997 | Robinson ................... 427/171 |
| 5,698,329 | A * | 12/1997 | Robinson ................ 428/411.1 |
| 5,770,312 | A * | 6/1998 | Robinson ................ 428/411.1 |
| 5,773,102 | A * | 6/1998 | Rehfeld ....................... 428/34 |
| 5,796,055 | A * | 8/1998 | Benson et al. ............. 181/208 |
| 5,979,932 | A * | 11/1999 | Jourdaine et al. ........ 280/730.2 |
| 6,074,732 | A | 6/2000 | Garnier et al. |
| 6,074,932 | A * | 6/2000 | Wu ............................ 438/435 |
| 6,119,807 | A | 9/2000 | Benson, Jr. et al. |
| 6,132,882 | A * | 10/2000 | Landin et al. .............. 428/437 |
| 6,352,754 | B1 * | 3/2002 | Frost et al. .................. 428/77 |
| 6,432,522 | B1 * | 8/2002 | Friedman et al. ........... 428/212 |
| 6,436,219 | B1 * | 8/2002 | Francis et al. ......... 156/244.11 |
| 6,903,152 | B2 * | 6/2005 | Toyama et al. ............. 524/403 |
| 2001/0046595 | A1 * | 11/2001 | Moran et al. ............... 428/212 |
| 2002/0006504 | A1 | 1/2002 | Rehfeld et al. |
| 2003/0054160 | A1 * | 3/2003 | Fisher et al. ............... 428/328 |
| 2005/0077002 | A1 * | 4/2005 | Anderson et al. .......... 156/278 |
| 2005/0089692 | A1 | 4/2005 | Anderson |
| 2005/0129954 | A1 * | 6/2005 | Anderson ................... 428/412 |
| 2005/0288429 | A1 | 12/2005 | Rymer et al. |
| 2006/0008648 | A1 | 1/2006 | Bennison et al. |
| 2006/0070694 | A1 | 4/2006 | Rehfeld et al. |
| 2006/0182983 | A1 | 8/2006 | Paul et al. |
| 2006/0210776 | A1 | 9/2006 | Lu et al. |
| 2006/0210782 | A1 | 9/2006 | Lu |

FOREIGN PATENT DOCUMENTS

| | | |
|---|---|---|
| EP | 0852999 A2 | 7/1998 |
| WO | WO01/19747 A1 | 3/2001 |
| WO | WO2005/058598 A1 | 6/2005 |

OTHER PUBLICATIONS

International Preliminary Report on Patentability for PCT/US2005/033834, dated Aug. 8, 2006.
PCT International Search Report, International Application No. PCT/US2005/033834, Dated Sep. 20, 2005.

* cited by examiner

Primary Examiner—Vivian Chen

(57) ABSTRACT

The present invention is a glass laminate having sound attenuation properties that make it suitable for use as acoustic glazing in architectural applications and/or in vehicles.

30 Claims, No Drawings

GLASS LAMINATES FOR REDUCTION OF SOUND TRANSMISSION

This application claims the benefit of U.S. Provisional Application No. 60/611,596, filed Sep. 20, 2004.

BACKGROUND OF THE INVENTION

1. Field of the Invention

This invention relates to laminates used in glazing applications. This invention particularly relates to laminates useful as acoustic glazing for sound dampening.

2. Description of the Related Art

Glass laminates having sound-damping properties have found use in architectural applications as well as in vehicles. Such acoustic laminates are desirable to reduce sound transmission from external sources to the interior of a building or an automobile, for example.

Plasticized polyvinyl butyral (PVB) sheet is used in the manufacture of transparent laminate structures such as, for example: windshields for vehicles including automobiles, motorcycles, boats and airplanes, windows in buildings such as office buildings, apartment buildings, houses, and/or commercial buildings, for example.

In modern vehicles—particularly in trains, planes and automobiles—passenger comfort has become an important selling point in commercial transactions involving same. One important feature in a modern vehicle is the ability to minimize noise that originates from outside of the passenger compartment of the vehicle. Automobiles are particularly targeted for improving the acoustic quality of the passenger's ride. Noises coming from the engine compartment, from the sound of tires rolling across a road or the ground, and wind noise created as a car moves at rapid speed through air are all contributors to the noise generated as a car is used as it was intended.

Various improvements and modifications have been made to cars in order to improve the quietness of a passenger's travel. However, one major source of noise is sound that passes through the windows of a vehicle. The windows of a car are typically good conductors of sound waves—particularly at critical sound frequencies, that is, at sound frequencies that are perceptible to the human ear. Moreover, sound reduction in office and other buildings from noise emanating from outside of the building can be desirable in settings where outside noises can reach the level of distraction inside of a building.

Various patents describe inventive attempts to address the problem of noise reduction in vehicles and/or in buildings. U.S. Pat. No. 5,368,917 and U.S. Pat. No. 5,478,615 describe acoustic laminated glazings for vehicles comprising conventional polyvinyl butyral (PVB). U.S. Pat. No. 6,132,882 describes a sound-damping laminate comprising a vibration-damping layer such as a polyacrylate, at least one flexible plastic layer such as PVB, and a rigid glass or plastic sheet. U.S. Pat. No. 5,773,102 describes a soundproofing laminated glass pane wherein a high-performance acoustic film is combined with at least one film having ordinary acoustic performance, such as PVB. U.S. Pat. No. 5,190,826 describes interlayers for use in sound-insulating laminated glass. U.S. Pat. No. 6,074,732 describes a soundproofing laminated window made of two glass sheets between which are polymer layers in the order of PVB/PET/acrylate/PET/PVB. The PVB layers are conventional (that is, non-acoustic) PVB. U.S. Pat. No. 6,432,522 describes transparent laminates having sound attenuation properties comprising an interlayer film having at least two layers. WO 01/19747 A1 describes glass laminates wherein PVB is softened (plasticized) with 20 to 50 wt % of a two-component plasticizer mixture comprising 30 to 70 wt % of a polyalkylene glycol as one of the components. However, impact resistance of a laminate using softened PVB can be detrimentally affected.

Use of ethylene acid copolymers or salts thereof produce rigid interlayers which can be particularly useful as threat-resistant glazing units in automobiles and buildings. Imparting sound-dampening properties to such interlayers can be difficult because of the rigidity of these materials, and relative lack of adhesion to other interlayer materials with known acoustic properties such as, for example, PVB.

It can be desirable to have a laminate with sound dampening (sound-damping) properties that retains its impact resistance and resistance to penetration. It can be particularly desirable to have such properties in a threat-resistant glazing unit.

SUMMARY OF THE INVENTION

In one aspect the present invention is a sound-damping laminate article comprising: at least 3-layers of composite interlayer, wherein one layer of the composite interlayer is a polyester (PET) polymer positioned between two dissimilar polymer layers, and wherein the dis-similar polymers are polymers selected from the group consisting of: polyvinylbutyrals (PVB); ionoplast resins (ionomers); polyurethanes (PU); polyvinyl chlorides; polycarbonates; polyacetals; ethylene acid copolymers, including ethylene acid terpolymers (acid copolymers); and polyolefins, including polyethylenes and polypropylenes.

DETAILED DESCRIPTION OF THE INVENTION

In one embodiment, the present invention is a laminate having sound-dampening properties. A laminate of the present invention has sound-damping properties in the frequency range of from about 10 Hz to about 10,000 Hz at a temperature in the range of from about 10° C. to about 30° C. A laminate of the present invention comprises a multilayer composite interlayer which comprises at least three polymer layers. Preferably the composite interlayer imparts to the laminate sound-damping properties in the range of from about 1,000 Hz to about 5,000 Hz at a temperature in the range of from about 10° C. to about 30° C. More preferably, the interlayer provides the above sound-damping properties at a temperature in the range of from about 15° C. to about 25° C.

Sound-damping, as the term is used in the present application, refers to the sound loss that occurs on the transmission of sound from an incident surface of a laminate (the surface exposed to a sound wave) to an interior surface of the laminate (the side opposite the incident surface). Individual laminate glazing constructions have a loss factor and an equivalent bending rigidity modulus that can be determined for each construction, and which can be related to Sound Transmission Loss for the glazing. Laminate glazing constructions of the present invention comprise three-layer interlayer laminate constructions having loss factors greater than about 0.05, measured at 20° C. by the method described herein throughout the range of from 50 to 10000 Hz. Preferably, laminates of the present invention have loss factors of at least about 0.08 throughout the range of from 50 to 10000 Hz, and more preferably the loss factor is at least about 0.15 throughout the range of from 50 to 10000 Hz.

In the practice of the present invention, an equivalent bending rigidity modulus can be determined to provide Sound Transmission Loss of the laminate glazing of the present invention.

A sound-damping laminate of the present invention comprises, or consists essentially of, a polyester (PET) layer positioned between at least two other polymeric interlayers that are chemically distinct from the PET layer such that the laminate structure can be described as comprising the structure: polymer 1/PET/polymer 2. Polymer 1 and polymer 2 can either be the same or can be different materials. While there is no strict order to the laminate construction of the composite interlayer, it can be preferred to position the PET layer directly between the at least two other layers such that polymer 1 and polymer 2 each contact opposite surfaces of the intervening PET layer. Other laminate structures can be envisioned utilizing multiple layers of any of the layers, or combining chemically distinct interlayers described herein in any combination that can provide the desirable acoustic effect. It is particularly preferred that the laminate have adhesion between the that is suitable for placing the laminate into typical glazing applications. Suitable adhesion can be inherent between the polymer layers, or can be the result of a process treatment, or a coating on at least one surface of the layers.

In one embodiment, the PET layer can be flame-treated to enhance adhesion to a dissimilar polymer layer. In a particularly preferred embodiment, the PET layer has a coating of a polyallylamine-based primer applied to at least one of its surfaces, preferably to both surfaces of the PET. PET coated with primer as described herein can provide a means for laminating two dissimilar polymeric interlayers that otherwise cannot be laminated conventionally. The primer and its application to the PET polymeric layer are described in U.S. Pat. Nos. 5,411,845; 5,770,312; 5,690,994; and 5,698,329. Generally, the PET film is extruded and cast as a film by conventional methods, and the polyallylamine coating is applied to the PET film either (i) before stretching or (ii) between the machine direction stretching and transverse direction stretching operations, and/or after the two stretching operations and heat setting in the stenter oven. It is preferable that the coating be applied before the transverse stretching operation so that the coated PET web is heated under restraint to a temperature of about 220° C. in the stenter oven in order to cure the polyallylamine to the PET surface. In addition to this cured coating, an additional polyallylamine coating can be applied on it after the stretching and stenter oven heat setting in order to obtain a thicker overall coating. The coated PET treated in this general manner is the primer (PRIMER) used herein to enhance the adhesion between dissimilar polymeric layers in a laminate construction. The coated PET layer can be required, for example, in producing a laminate construction wherein polymer 1 and polymer 2 referenced hereinabove are selected from ionomeric copolymers and polyvinylbutyrals. PVB and ionoplast interlayers do not normally adhere to each other satisfactorily without, for example, flame treatment of an intermediary adhesive layer.

Adhesive strength in a laminate of the present invention is determined by the 90° peel test. The adhesive strength between dissimilar polymer layers in the present invention can be about zero (0) to about less than 10 lb/inch without any treatment to enhance adhesion, and with flame treatment the adhesive strength can be improved to about 10 lb/inch. Using a PRIMER as described herein can improve the peel strength to at least about 10 lb/in, and preferably to at least 15 lb/inch. Peel strength can give indication of the integrity of the multilayer laminate, and high peel strength can be an indicator of good resistance to delamination in the fully constructed laminate.

Suitable polymers useful in a laminate of the present invention include, for example: PET; PVB (standard non-acoustic PVB and/or "acoustic" PVB wherein acoustic PVB is highly plasticized PVB, as described herein); ionoplast resins, which are ethylene acid copolymer ionomers (that is, at least partially neutralized acid copolymers); ethylene vinyl acetates (EVA); polyurethanes; polyvinyl chlorides; polycarbonates; polyacetals; ethylene acid copolymers (which are inclusive of ethylene acid terpolymers); polyolefins, including polyethylenes and polypropylenes. Preferred for use herein are polymers that are transparent, or that can be made to be transparent, such that they are suitable for use in glazing end-use applications. Particularly preferred for use herein are PET, PVB, and ionoplast resins.

Non-acoustic PVB is a commercially available product that can be obtained from E.I. DuPont de Nemours and Company (DuPont) under the tradename of Butacite®. Ionoplast resins suitable for use herein are copolymers (inclusive of terpolymers) of ethylene and unsaturated carboxylic acids wherein at least a portion of the acid groups in the copolymer have been neutralized to the salt form of the acid. Extruded sheets of ionoplast resin suitable for use in the present invention can be obtained from DuPont under the trade name of SentryGlas® Plus (SGP).

Polyester films (PET) are well-known polymer films that can also be obtained commercially. PET suitable for use herein can additionally comprise a hardcoat such as an abrasion resistant polysiloxane material or an oligomeric coating as described in U.S. application Ser. No. 10/925,842 (published as US 2005-0077002 A 1 on Apr. 14, 2005) on one of its surfaces. The polysiloxane coated PET can be obtained commercially from DuPont. In laminates of PET and other polymers such as PVB and SGP, it can be conventional to enhance the adhesion of the PET to the other polymers by some treatment step such as a flame treatment. In the practice of the present invention, adhesion of PET to any of the other polymers can be improved by either flame treating the PET or by applying PRIMER to either surface of the dissimilar polymers prior to laminating the layers using conventional laminating methods. Use of the PRIMER to improve the adhesion of PET to PVB can eliminate the need for a flame treatment to obtain suitable adhesion between these polymers.

In one embodiment, the PET can be used to adhere stiff PVB having a low plasticizer content (less than 15 pph parts)—and thus higher modulus—to "normal" PVB and/or to other polymeric interlayer materials as defined herein.

In a particularly preferred embodiment the sound-damping laminate of the present invention comprises at least one layer of a sound-damping (acoustic) PVB that is highly plasticized with at Least one plasticizer or a mixture of plasticizers. In this embodiment the plasticizer is included in an amount of from about 40 parts per hundred (pph) to about 50 pph parts PVB. Preferably, the interlayer is plasticized with from about 41 pph to about 49 pph, more preferably from about 42 pph to about 49 pph. and most preferably from about 44 to about 47 pph. In a much preferred embodiment, the sound-damping PYB is highly plasticized with one plasticizer. PVB useful in the practice of the present invention is described in U.S. application Ser. No. 10/519,661, fully incorporated herein by reference (published as US 2005-0288429 A 1 on Dec. 29, 2005).

Sound-damping (acoustic) PVB as used in the practice of the present invention can be used in any thickness that provides the desired acoustic effect when combined with the other components of the laminate. Preferably, however, the PVB used has a thickness in the range of from about 15 mils to about 90 mils. More preferably, the sound-damping PVB has a thickness in the range of from about 1 mil to about 60 mils, and even more preferably in the range of from about 10 mils to about 40 mils. Most preferably, the thickness of the sound-damping PVB is in the range of from about 15 mils to about 40 mils. Multiple PVB sheets of various thicknesses can be stacked to obtain a sound-damping PVB stack having a desirable thickness.

Plasticizer suitable for use in the practice of the present invention is any plasticizer that is used conventionally with PVB. For example, conventional plasticizers useful in the preparation of plasticized PVB include such plasticizers as: diesters of polyethylene glycol such as triethylene glycol di(2-ethylhexanoate) (3GO), tetraethylene glycol di-heptanoate (4G7), triethyleneglycol di(2-ethylbutyrate), and di-hexyl adipate. Most preferred for use in highly plasticized PVB is 4G7.

Preferably, the plasticizer is one that is compatible (that is, forms a single phase with the interlayer) in the amounts described hereinabove, with regard to acoustic PVB, with PVB having a hydroxyl number (OH number) of from about 17 to about 23. Preferably the PVB of the present invention has an OH number of from about 18 to about 21, more preferably the OH number is from about 18 to about 19.5, and most preferably from about 18 to about 19. A particularly preferred plasticizer for use in the practice of the present invention is one which is compatible with the PVB in any of the preferred ranges for hydroxyl number.

Generally, laminates of the present invention can be useful in architectural as well as in vehicular applications. For example, the laminates of the present invention can be useful as: windows in buildings; doors; partitions; hurricane windows; bullet-resistant glazings; sidelites, moonroofs, sunroofs and windshields in automobiles; windows in planes and trains; and other applications where sound-dampening laminated glazings can be desirable.

Acoustic laminates of the present invention can be combined with decorative interlayers to produce glazings that reduce sound transmission in addition to incorporating designs, graphics, colors, or other decorative images.

EXAMPLES

The Examples and Comparative Examples are presented for illustrative purposes only, and are not intended to limit the scope of the present invention in any manner that is inconsistent with the teachings provided of the specification.

Laminates having the structures given below were made using an autoclave cycle of 135° C. at 200 psi for 30 minutes using a conventional vacuum bagging process.

Test Methods

Loss Factor (η) Determination

Loss factor is determined from the measurement of the input impedance of a glass beam sample. A glass laminate specimen (25 mm×300 mm) is placed at its center onto an impact button (15 mm diameter), and affixed thereto with a cyanoacrylic glue. The impact button is supported on an impedance head, which is used to inject a measured force into the specimen via the impact button. A white noise type force between 0 and 5000 Hz is used to inject the specimen.

The loss factor is then calculated using the formula:

$$\eta = \Delta f_i / f_{resi},$$

where $\Delta f_i$ is the frequency difference between the frequencies on the resonance curve ($f_{resi}$) having an impedance of 3 dB less than the maximum impedance. The specimen held in an environmental chamber at the desired set temperature before and during the determination. The impedance head is connected to a dash pot, which is connected to a power amplifier, which is connected to a noise generator. The impedance is measured by a FFT analyzer/computer set-up. A detailed description of the method and apparatus are described in ISO/PDPAS 16940 (published Jul. 16, 2002): "Glass in Building—Glazing and Airborne Sound Insulation—Measurement of the Mechanical Impedance of Laminated Glass", herein incorporated by reference.

Example 1

GLASS/ionomer/PET/PVB/GLASS laminates were prepared using PET coated on both sides with a polyallylamine primer coating. Laminated to opposite surfaces of the PET were one sheet each of 30 mil thick PVB interlayer (BE-1028 Butacite®, available from DuPont) and 60 mil thick SentryGlas®) Plus ionoplast interlayer (available from DuPont). The PET sheet was 6.5-7.0 mils thick. The loss factor was calculated and is reported in Table 1.

Comparative Example 1 (C1)

The procedure of Example 1 was followed with the exception that the laminate of this example included two layers of ionomer interlayer with the PET layer. The loss factor was calculated and is reported in Table 1.

Comparative Example 2 (C2)

A laminate having a structure Glass/90 mil ionomer/Glass was constructed and measured for loss factor. The results are reported in Table 1.

Comparative Example 3 (C3)

A laminate having a structure Glass/90 mil PVB/Glass was constructed and measured for loss factor. The results are reported in Table 1.

Comparative Example 4 (C4)

A laminate having a structure Glass/90 mil acoustic PVB/Glass was constructed and measured for loss factor. The results are reported in Table 1.

Example 2

The procedure of Example 1 was followed with the exception that a laminate having the structure Glass/60 mil ionomer/PET/40 mil acoustic PVB/Glass was constructed and measured for loss factor. The results are reported in Table 1.

Example 3

The procedure of Example 2 was followed with the exception that a laminate having the structure Glass/60 mil ionomer/PET/30 mil acoustic PVB/Glass was constructed and measured for loss factor. The results are reported in Table 1.

Example 4

The procedure of Example 3 was followed with the exception that a laminate having the structure Glass/60 mil PVB/PET/30 mil PVB/Glass was constructed and measured for loss factor. The results are reported in Table 1.

Example 5

The procedure of Example 4 was followed with the exception that a laminate having the structure Glass/60 mil acoustic PVB/PET/30 mil acoustic PVB/Glass was constructed and measured for loss factor. The results are reported in Table 1.

Example 6

The procedure of Example 5 was followed with the exception that a laminate having the structure Glass/60 mil PVB/PET/30 mil acoustic PVB/Glass was constructed and measured for loss factor. The results are reported in Table 1.

Example 7

The procedure of Example 6 was followed with the exception that a laminate having the structure Glass/60 mil colored PVB/PET/40 mil acoustic PVB/Glass was constructed and measured for loss factor. The results are reported in Table 1.

Comparative Example 5 (C5)

A laminate having a structure Glass/40 mil acoustic PVB/Glass was constructed and measured for loss factor. The results are reported in Table 1.

Comparative Example 6 (C6)

A laminate having a structure Glass/30 mil acoustic PVB/Glass was constructed and measured for loss factor. The results are reported in Table 1.

What is claimed is:

1. A sound-damping laminate comprising a polyester polymer layer positioned between polymer layer 1 and polymer layer 2, wherein the polymer layer 1 is a polyvinyl butyral layer and the polymer layer 2 is an ionoplast resin (ionomer) layer.

2. The laminate of claim 1 wherein the polyester layer contains a surface coated with a polyallylamine-based primer in contract with the ionoplast resin (ionomer) layer.

3. The laminate of claim 2 further comprising a glass layer on the outside of the polyvinyl butyral layer or the ionoplast resin (ionomer) layer.

4. The laminate of claim 1 wherein the polyester layer is coated on both surfaces with a polyallylamine-based primer and is in contract with the polyvinyl butyral layer and the ionoplast resin (ionomer) layer.

5. The laminate of claim 4 further comprising a glass layer on the outside of the polyvinyl butyral layer and a second glass layer on the outside of the ionoplast resin (ionomer) layer.

6. The laminate of claim 1 wherein the laminate has an adhesive strength of at least about 10 lb/in$^2$.

7. The laminate of claim 6 wherein the laminate has not been flame treated.

8. The laminate of claim 7 wherein the polyester layer contains a surface coated with a polyallylamine-based primer in contract with either the polymer layer 1 or the polymer layer 2.

9. The sound-damping laminate of claim 8 wherein the laminate further comprise a glass layer adhered to the outside of the polyvinyl butyral layer and a second glass layer adhered to the outside of the ionoplast resin (ionomer) layer, and wherein the laminate has a loss factor of at least about 0.080 measured at 20° C. in the range of 50 to 10,000 Hz.

10. The laminate of claim 9 further comprising a glass layer on the outside of the polyvinyl butyral layer and a second glass layer on the outside of the ionoplast resin (ionomer) layer, and wherein the polyester layer contains a surface coated with a polyallylamine-based primer in contract with the ionoplast resin (ionomer) layer.

11. The laminate of claim 9 wherein the loss factor is at least about 0.15 throughout the range of from 50 to 10000 Hz.

12. An article comprising the laminate of claim 1.

13. The article of claim 12 wherein the article is an automobile.

TABLE 1

| | Loss Factor (20° C.) @ Frequency (Hz) | | | | | | | | | |
|---|---|---|---|---|---|---|---|---|---|---|
| Ex. | 260 | 1000 | 1500 | 2500 | 3500 | 4500 | 5000 | 5500 | 6000 | 6500 |
| 1 | 0.058 | 0.062 | 0.064 | 0.074 | 0.077 | 0.072 | 0.070 | | | |
| 2 | 0.109 | 0.151 | 0.166 | 0.174 | 0.170 | 0.163 | 0.163 | 0.163 | 0.162 | 0.162 |
| 3 | 0.088 | 0.121 | 0.138 | 0.159 | 0.159 | 0.146 | | | | |
| 4 | 0.084 | 0.130 | 0.150 | 0.170 | 0.178 | 0.178 | | | | |
| 5 | 0.332 | 0.323 | 0.329 | 0.321 | 0.290 | 0.247 | 0.219 | | | |
| 6 | 0.194 | 0.269 | 0.279 | 0.285 | 0.271 | 0.260 | 0.255 | 0.252 | 0.248 | |
| 7 | 0.204 | 0.272 | 0.272 | 0.270 | 0.262 | 0.260 | 0.255 | 0.246 | 0.240 | |
| C1 | 0.048 | 0.028 | 0.018 | 0.021 | 0.028 | 0.038 | 0.043 | | | |
| C2 | 0.044 | 0.029 | 0.021 | 0.024 | 0.028 | 0.026 | 0.024 | 0.025 | 0.027 | 0.028 |
| C3 | 0.096 | 0.134 | 0.153 | 0.181 | 0.189 | 0.184 | | | | |
| C4 | 0.255 | 0.294 | 0.291 | 0.283 | 0.275 | 0.253 | 0.243 | 0.232 | | |
| C5 | 0.204 | 0.270 | 0.270 | 0.269 | 0.264 | 0.252 | 0.243 | 0.237 | | |
| C6 | 0.185 | 0.260 | 0.260 | 0.261 | 0.270 | 0.269 | 0.266 | 0.261 | | |

14. The article of claim 13 wherein the laminate is a windshield, a side-lite, a moon-roof, or a sun-roof.

15. The article of claim 12 wherein the article is a building.

16. The article of claim 15 wherein the laminate is a window, door, floor, ceiling, stairs, wall, partition, or other structural building component.

17. The laminate of claim 1 further comprising a glass layer adhered to at least one of the outside of the polyvinyl butyral layer and the ionoplast resin (ionomer) layer.

18. The laminate of claim 1 further comprising a glass layer on the outside of the polyvinyl butyral layer and a second glass layer on the outside of the ionoplast resin (ionomer) layer.

19. The laminate of claim 1 wherein the polyvinyl butyral layer is a sound-damping polyvinyl butyral layer having a plasticizer content of from about 40 pph to about 50 pph per parts polyvinyl butyral.

20. The laminate of claim 19 wherein the polymer layer 2 is an ionoplast resin (ionomer) layer, and wherein the polyester layer contains a surface coated with a polyallylamine-based primer in contract with the ionoplast resin (ionomer) layer.

21. The laminate of claim 20 wherein the sound-damping polyvinyl butyral layer having a plasticizer content of from about 44 pph to about 47 pph per parts polyvinyl butyral.

22. The laminate of claim 20 wherein the plasticizer is selected from the group consisting of triethylene glycol di(2-ethylhexanoate), tetraethylene glycol di-heptanoate, triethyleneglycol di(2-ethylbutyrate), and di-hexyl adipate.

23. The laminate of claim 20 further comprising a glass layer on the outside of the polyvinyl butyral layer and a second glass layer on the outside of the ionoplast resin (ionomer) layer.

24. The laminate of claim 23 wherein the polyvinyl butyral layer has a plasticizer content of from about 44 pph to about 47 pph per parts polyvinyl butyral, and wherein the plasticizer is selected from the group consisting of triethylene glycol di(2-ethylhexanoate), tetraethylene glycol di-heptanoate, triethyleneglycol di(2-ethylbutyrate), and di-hexyl adipate.

25. The laminate of claim 19 wherein the sound-damping polyvinyl butyral layer having a plasticizer content of from about 42 pph to about 49 pph per parts polyvinyl butyral.

26. The laminate of claim 19 wherein the sound-damping polyvinyl butyral layer having a plasticizer content of from about 44 pph to about 47 pph per parts polyvinyl butyral.

27. The laminate of claim 19 wherein the plasticizer for the sound-damping polyvinyl butyral layer is selected from the group consisting of diesters of polyethylene glycol.

28. The laminate of claim 19 wherein the plasticizer for the sound-damping polyvinyl butyral layer is selected from the group consisting of triethylene glycol di(2-ethylhexanoate), tetraethylene glycol di-heptanoate, triethyleneglycol di(2-ethylbutyrate), and di-hexyl adipate.

29. The laminate of claim 19 wherein the plasticizer for the sound-damping polyvinyl butyral layer is tetraethylene glycol di-heptanoate.

30. The laminate of claim 19 further comprising a glass layer adhered to the outside of the sound-damping polyvinyl butyral layer.

* * * * *

UNITED STATES PATENT AND TRADEMARK OFFICE
CERTIFICATE OF CORRECTION

PATENT NO. : 7,297,407 B2  Page 1 of 1
APPLICATION NO. : 11/230812
DATED : November 20, 2007
INVENTOR(S) : Jerrel C. Anderson It is certified that error appears in the above-identified patent and that said Letters Patent is hereby corrected as shown below:

Claim 9, column 8, line 35, delete "." after C, line should read --about 0.080 measured at 20° C in the range of 50 to 10000--

Signed and Sealed this

First Day of July, 2008

JON W. DUDAS
*Director of the United States Patent and Trademark Office*